(12) United States Patent
Enström et al.

(10) Patent No.: US 10,233,801 B2
(45) Date of Patent: Mar. 19, 2019

(54) DEVICE FOR CLEANING A CONTAMINATED CRANKCASE GAS

(71) Applicant: VOLVO TRUCK CORPORATION, Göteborg (SE)

(72) Inventors: Anders Enström, Tostared (SE); Fredrik Lagerlöf, Stenkullen (SE)

(73) Assignee: Volvo Truck Corporation, Göteborg (SE)

( * ) Notice: Subject to any disclaimer, the term of this patent is extended or adjusted under 35 U.S.C. 154(b) by 83 days.

(21) Appl. No.: 15/513,031

(22) PCT Filed: Oct. 3, 2014

(86) PCT No.: PCT/EP2014/025005
§ 371 (c)(1),
(2) Date: Mar. 21, 2017

(87) PCT Pub. No.: WO2016/050255
PCT Pub. Date: Apr. 7, 2016

(65) Prior Publication Data
US 2018/0179928 A1    Jun. 28, 2018

(51) Int. Cl.
| | |
|---|---|
| F01M 13/00 | (2006.01) |
| F02B 25/06 | (2006.01) |
| F01M 13/04 | (2006.01) |
| B01D 45/14 | (2006.01) |
| F02B 67/04 | (2006.01) |
| F02B 67/08 | (2006.01) |

(52) U.S. Cl.
CPC ............ *F01M 13/04* (2013.01); *B01D 45/14* (2013.01); *F02B 67/04* (2013.01); *F02B 67/08* (2013.01); *F01M 2013/0422* (2013.01); *F01M 2013/0433* (2013.01)

(58) Field of Classification Search
CPC .......... F01M 13/04; F01M 2013/0422; F01M 2013/0433; F01M 2013/0438; B01D 45/14; F02B 67/04; F02B 67/08
USPC ......... 123/41.86, 73 SC, 573, 196 CP, 198 P
See application file for complete search history.

(56) References Cited

U.S. PATENT DOCUMENTS

| 368,683 A | 8/1887 | Pemberton |
|---|---|---|
| 5,795,477 A | 8/1998 | Herman et al. |

(Continued)

FOREIGN PATENT DOCUMENTS

| CN | 1205650 A | 1/1999 |
|---|---|---|
| CN | 102821866 A | 12/2012 |

(Continued)

OTHER PUBLICATIONS

International Search Report (dated Jun. 23, 2015) for corresponding International App. PCT/EP2014/025005.

(Continued)

*Primary Examiner* — Syed O Hasan
(74) *Attorney, Agent, or Firm* — WRB-IP LLP

(57) ABSTRACT

A device for cleaning a contaminated crankcase gas generated during operation of an internal combustion engine is provided. An internal combustion engine including such a device is also provided. The device permits for an increased flexibility as to constructing the cleaning device while maintaining or possibly improving cleaning of the contaminated crankcase gas.

19 Claims, 6 Drawing Sheets

(56) References Cited

U.S. PATENT DOCUMENTS

| | | | |
|---|---|---|---|
| 2010/0139585 A1* | 6/2010 | Frazier, Jr. | B01D 46/0031 123/41.86 |
| 2010/0199958 A1* | 8/2010 | Heckel | F02M 25/06 123/572 |
| 2012/0240536 A1 | 9/2012 | Den Dopper | |
| 2014/0237961 A1* | 8/2014 | Szepessy | B01D 45/14 55/385.1 |

FOREIGN PATENT DOCUMENTS

| | | |
|---|---|---|
| DE | 422641 C | 12/1925 |
| DE | 1935154 A1 | 3/1970 |
| DE | 29605508 U1 | 6/1996 |
| DE | 10128465 A1 | 1/2003 |
| DE | 20302824 U1 | 7/2004 |
| EP | 1532353 B1 | 5/2005 |
| JP | S575905 U | 1/1982 |
| JP | 2006336619 A | 12/2006 |

OTHER PUBLICATIONS

International Preliminary Report on Patentability (dated Jan. 4, 2017) for corresponding International App. PCT/EP2014/025005.
Chinese Official Action (dated Dec. 11, 2018) for corresponding Chinese App. 302560082417.5.

* cited by examiner

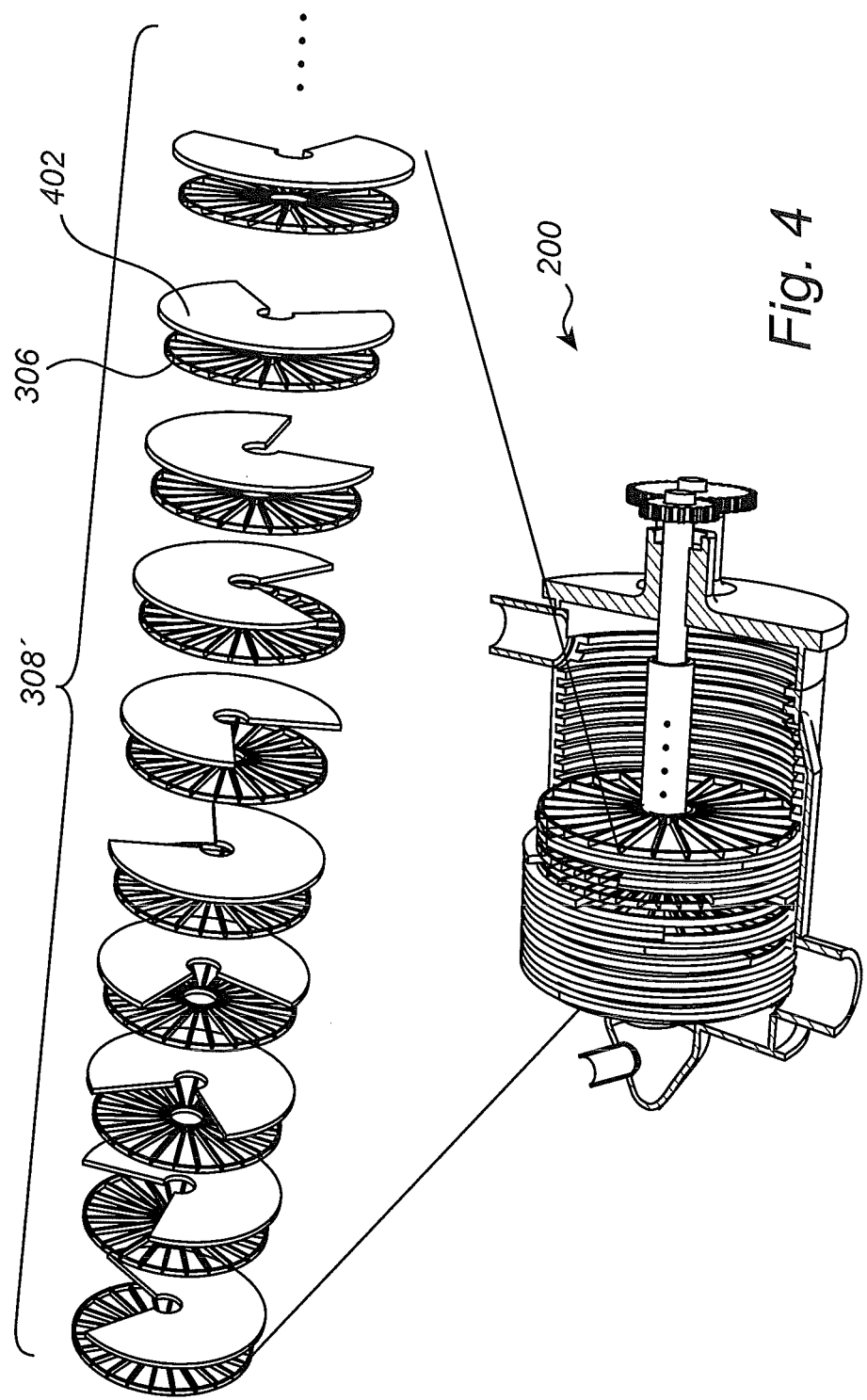

DEVICE FOR CLEANING A CONTAMINATED CRANKCASE GAS

The present invention generally relates to a device for cleaning a contaminated crankcase gas generated during operation of an internal combustion engine. The invention also relates to an internal combustion engine comprising such a device.

When operating an internal combustion engine (ICE), it is necessary to handle the small amount of gases leaking past the piston rings of the cylinder and into a crankcase of the engine. The crankcase gas may in some applications be vented to the atmosphere, or as an alternative the crankcase gas may be fed back into the intake manifold, to re-enter the combustion chamber as part of a fresh charge of air and fuel.

However, before re-entering the combustion chamber or entering the atmosphere, the crankcase gas is typically cleaned using a cleaning device, which effectively can separate very small particles, solid and/or liquid, suspended in the crankcase gas. Different types of cleaning devices have been proposed, such as traditional filters, cyclones or different kinds of centrifugal separators having rotating members. Lately, centrifugal separators of a relatively advanced kind have been proposed for such cleaning, and different methods have been proposed for driving of centrifugal separators of these kinds.

A centrifugal separator of the type named above is known for example from EP1532353B1. This known centrifugal separator is used to separate solid and/or liquid particles out from a gas stream. The separator has a conical rotor that is formed to a plate stack and is situated in a housing, where the conical rotor is set into rotation by an electric motor. The gas stream that is to be cleaned enters the housing axially and flows through the rotor in the direction from radially inner to radially outer. The separated-out particles contact the inner surface of a circumferential wall of the housing of the centrifugal separator, and from there they are led downward by the action of gravity, to a separate outlet. The cleaned gas flows upward in the axial direction, to a cleaned gas outlet provided there.

Even though EP1532353B1 shows a promising approach to cleaning of crankcase gases, it would be desirable to further improve the cleaning of the crankcase gas. Specifically, it would be desirable to allow for less constrains as to the size of the cleaning device, constrains generally set by the conical rotor of the centrifugal separator. In addition, it would be desirable to be able to further control the level of cleaning of the crankcase gas.

According to an aspect of the invention, the above is at least partly alleviated by a device for cleaning a contaminated crankcase gas generated during operation of an internal combustion engine (ICE), the ICE comprising a crankcase, the device comprising a housing having a longitudinally extending side wall portion, the housing comprising an inlet configured to receive the contaminated crankcase gas from the crankcase and an outlet configured to release a cleaned crankcase gas out from the housing. The cleaning device further comprise a fan configured to establishing a gas flow through the housing between the inlet and the outlet and a cleaning arrangement for cleaning the contaminated crankcase gas, the cleaning arrangement being arranged inside of the housing. The cleaning arrangement comprises a traverse wall member configured to cover a portion of a cross section of the housing, wherein the traverse wall is configured to at least partly restrict the gas flow and/or affect a direction of the gas flow, and a rotatably arranged member arranged downstream of the traverse wall in the direction of the gas flow, wherein the rotatably arranged member comprises a plurality of wings and by its rotation is configured to redirect contaminants comprised in the crankcase gas towards an inside surface of the longitudinally extending side wall portion of the housing.

Conversely to using the prior art arrangement comprising a stack of conical centrifugal rotors for cleaning the crankcase gas, the present invention combines a traverse wall member and a rotatably arranged member arranged downstream of the traverse wall member for cleaning the crankcase gas. The traverse wall member is arranged such that the direction of the flow of the crankcase gas inside of the housing is affected and/or restricted, whereby small particles, such as small oil droplets, when passing the traverse wall member are merged together into bigger droplets that are easier to separate from the gas. That is, after passing the traverse wall member, the gases and bigger oil droplets comes in contact with wings of the rotatably arranged member, where the wings during rotation will throw the oil droplets out radially to the inside surface of the housing.

The use of the traverse wall member combined with the rotatably arranged member will advantageously allow for an increased flexibility as to constructing the cleaning device while maintaining or possibly improving cleaning of the contaminated crankcase gas. For example, the size of the rotatably arranged member as well as how the wings are arranged at the rotatably arranged member may be highly flexible. In an embodiment, an in comparison large rotatably arranged member may be used at a low rotational speed, or alternatively an in comparison small rotatably arranged member may be used at a high rotational speed.

Conversely to what is possible in regards to implementing a cleaning device comprising a conical centrifugal rotor, there will according to the present invention not be necessary to restricting the gas to axially enter the housing. Rather, any positioning of the inlet is possible. An advantage following the flexible positioning of the inlet is that a simplified arrangement may be applied for rotating the rotatably arranged member, such as connecting the rotatably arranged member to an axis partly centrally extending into the housing from an outside end. This in turns allows for lower cost for manufacturing as compared to prior art centrifuge solutions.

Furthermore, it should be noted that the fan may be provided as integrated inside of the housing. However, the fan may also be arranged as a separate element provided outside of the housing and in connection with at least one of the inlet and the outlet of the housing. It may be possible to include more than one fan, e.g. one at the inlet and one at the outlet.

In a preferred embodiment, the rotatably arranged member is arranged in parallel with the traverse wall member in the direction of the gas flow. Preferably, each of the rotatably arranged member and the traverse wall member extends along a flat plane and are arranged so that the planes are in parallel with each other. Further, the rotatably arranged member and the traverse wall member are preferably arranged so that the planes are perpendicular to a longitudinal direction of the housing defining the direction of the gas flow from the inlet to the outlet.

In a further preferred embodiment, the rotatably arranged member is arranged in a close vicinity of the traverse wall member. In such a scenario the distance between the rotatably arranged member and the traverse wall member is preferably kept as low as below 5 centimeters, more preferably less than 2 centimeters and most preferably less than 1 centimeter. By such an arrangement, it will be possible to quickly change the direction of the gas flow such that the contaminants in the crankcase gas are effectively clustered together. Again, when getting in contact with the wings of the rotatably arranged member, the contaminant clusters are redirected towards the inside surface of the housing.

Preferably, the fan and the rotatably arranged member are jointly constituted, forming a wing wheel. In such an embodiment, the wings of the rotatably arranged member are positively angled in such a manner that a suction force is produced. The suction force is preferably such that at least the gas pressure at the outlet of the housing is essentially corresponding to the gas pressure at the inlet of the housing. Accordingly, it is desirable to control the angle of the wings and the rotational speed of the rotatably arranged member such that only a small difference in gas pressure is found between the inlet and the outlet, preferably less than 10%, more preferably less than 5%. Furthermore, to arrange the angle of the wings in a way to create a slight under pressure in the internal combustion engine would have a positive effect on the sealing's of the engine.

It is desirable to form the traverse wall member as a flat disc, preferably arranged to be stationary in the housing. In an embodiment, the flat disc is fixed to the inside surface of the housing. Accordingly, the traverse wall member is typically provided with a centrally arranged opening for allowing the axis to pass through the traverse wall member, where as mentioned above the rotatably arranged member is fixed to the axis.

The effect of restricting the gas flow and/or affect a direction of the gas flow may be achieved in different ways, and in an embodiment of the invention the traverse wall member comprises a plurality of through holes. Thereby, a portion of the cross section of the housing will effectively restrict the gas flow, also affecting the direction of gas flow when approaching the traverse wall member. It may also be possible and within the scope of the invention to only restrict a sectional area of the cross section of the housing. For example, a three quarters or a half of the cross section of the housing may be restricted by the traverse wall member.

Preferably, the traverse wall member is rigidly connected to an inside of the housing. Further preferably, the traverse wall member conforms to an internal cross section shape of the housing, at least along a portion of its circumference, thereby forcing the gas towards the through holes during operation. Further preferably, the rotatably arranged member conforms to an internal cross section shape of the housing, at least along a portion of its circumference. Further preferably, the traverse wall member and the rotatably arranged member are configured with substantially the same cross sectional shape and size.

Also the housing may be formed in different ways to for best suiting a desired implementation of the cleaning device. In an exemplary embodiment the housing presents a circular cross section. Accordingly, the flat disc shaped traverse wall member may have a similar circular form. The circular traverse wall member may in such a scenario for example be press fitted to the circular housing, or alternatively affixed to the housing by spot welding or in any other suitable way.

As an alternative, the housing may presents a cross section having at least one of a tapered lower end and a tapered upper end. Such a shape may provide advantages for collecting the clustered containments received by the inside of the housing. Preferably, the tapered lower end and/or the tapered upper end defines the inside surface of the longitudinally extending side wall portion of the housing. For example, in case of having a cross section with a tapered lower end, the gravity may further act on the clustered containments for allowing simplified collection at a bottom side of the housing. Similarly, a cross section with a tapered upper end may make less oil droplets to stay on the upper inside surface of the housing, but rather move to the bottom side of the housing for a simplified collection of the contaminants. It is of course possible to provide a housing having both an upper and a lower tapered end. Other forms and shapes of the housing, for providing a similar effect are of course possible and within the scope of the invention. The expression "tapered" should be interpreted in its broadest sense and also including slightly curved portions of the housing. Another positive effect of a tapered form of the housing is that if the flat disks are following this form, no other arrangements need necessarily to be done to fixate them and to prevent them to rotate.

Preferably, the housing has an elongated form. In a possible embodiment, the inlet is arranged in the vicinity of a first end of the elongated housing in its extension direction, and the outlet is arranged at the second end of the elongated housing in its extension direction, wherein the first and second ends are provided on opposite sides of the housing. Providing such a form may for example allow for recirculation of the crankcase gas from a region downstream of the rotatably arranged member to a region upstream of the traverse wall member. A valve mechanism may be provided with the cleaning device for controlling the amount of crankcase gas being recirculated. In a possible embodiment, a level of crankcase gas recirculation may be based on a crankcase gas pressure, for example in the crankcase. Accordingly, such an arrangement may see to that the pressure drop in the housing is minimized, as well as keeping the pressure within the crankcase to be at a predetermined desired level. The valve mechanism may be provided using mechanical means connecting a sensing element within the crankcase for controlling the valve. Alternatively, the valve mechanism may be electrical and controlled based on information provided from a sensor arranged at the crankcase. A control unit may be provided for controlling such a sensor-electrical implementation.

In an embodiment, the rotatably arranged member is configured to be connected to a transmission of and mechanically driven by the internal combustion engine. In the broadest sense, where the rotatably arranged member is connected to an axis at least partly extending inside of the housing, the axis is connected to any form or rotational element connected to the internal combustion engine. Thus, any form of for example cog or belt arrangement connecting to a rotating element of the internal combustion engine is possible and within the scope of the invention. Further rotating elements may be included for achieving a desirable rotational speed of the axis.

As an alternative, the rotatably arranged member may be configured to be driven by an electric motor. In a similar manner as discussion above, the electric motor may be connected to the axis provided for rotating the rotatably arranged member. The electrical motor may in one embodiment be configured to allow for an adjustable rotational speed of the axis/rotatably arranged member. The rotational speed may furthermore be controlled using the above mentioned control unit, for example based on the pressure in the crankcase. As an alternative, the rotatably arranged member may be configured to be driven by a hydraulic motor, a turbine, etc.

In a preferred embodiment of the invention, the cleaning device comprises a plurality of traverse wall members and rotatably arranged members arranged in a stack. Preferably, the rotatably arranged members are connected to the above discussed axis, and the traverse wall members are fixed to the inner surface of the longitudinally extending side wall portion of the housing. Thus, during operation the cleaning device the rotatably arranged members will simultaneously rotate based on a rotation of the axis, whereas the plurality of traverse wall members will stay in a stationary position as compared to the rotatably arranged members. By providing a plurality of traverse wall members and rotatably arranged members, it will be possible to further increase the cleaning of the crankcase gas, as the gas will have to pass by, preferably, all of the traverse wall members and rotatably arranged members on its way from the inlet to the outlet of the housing.

It may be advantageous to alternatingly arrange the plurality of traverse wall members and rotatably arranged members in the stack. Accordingly, the gas will be altered and/or redirected at least once for time it comes in contact with a "new" traverse wall member. It may however also be possible to provide more than one traverse wall member between two rotatably arranged members. In such a manner, a further amount of redirection of the gas may be achieved.

The cleaning device preferably forms part of an internal combustion engine. The internal combustion engine may in turn form part of a power train, further comprising a transmission in operational connection with the axis connected to the rotatably arranged member. During operation of the internal combustion engine, a rotational force is provided through the transmission for driving the axis. The powertrain is preferably arranged in a vehicle, such as a heavy-duty vehicle, specifically in relation to a truck, a bus or any form of construction equipment.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which:

FIG. 4 illustrates alternative embodiment for redirecting/restricting a gas flow though the cleaning device.

DETAILED DESCRIPTION

Figure 1:
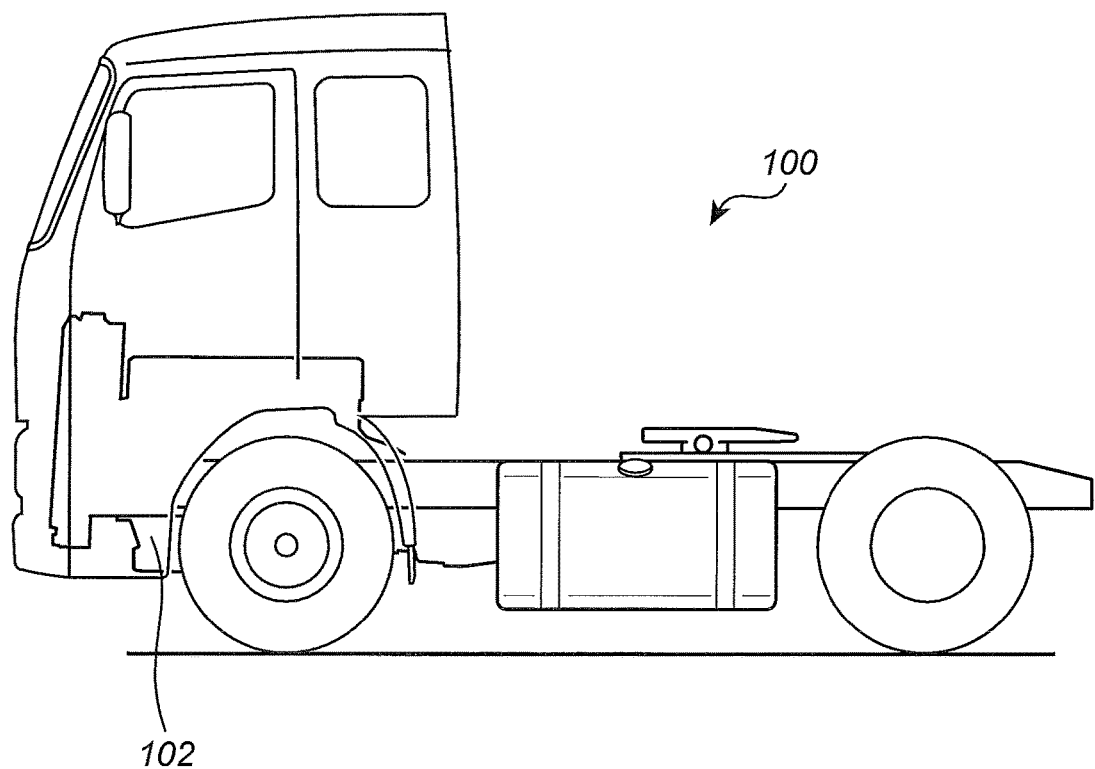
FIG. 1 illustrates a vehicle equipped with an internal combustion engine according to the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Referring now to the drawings and to FIG. 1 in particular, there is depicted an exemplary vehicle, here illustrated as a truck 100. The truck 100 is provided with a source of motive power 102 for propelling the truck via a driveline connecting the power source to the wheels. The power source 102 is constituted by an internal combustion engine (ICE) in the form of a diesel engine. It will in the following for ease of presentation be referred to as an internal combustion engine 102.

Figure 2:
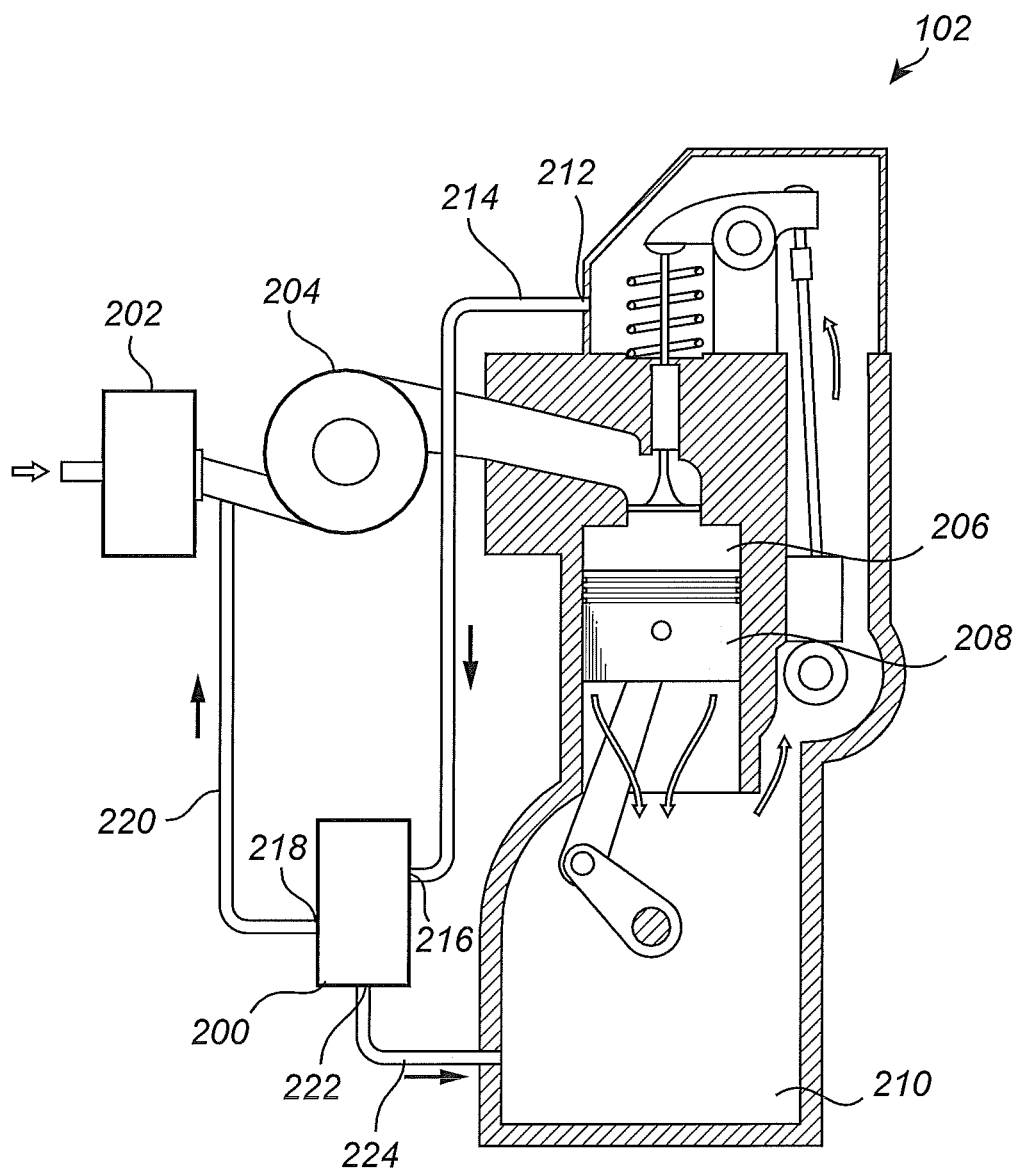
FIG. 2 conceptually illustrates an internal combustion engine equipped with a cleaning device.

FIG. 2 shows the internal combustion engine 102 equipped with a cleaning device 200 according to the invention.

During use of the ICE 102, ambient air will be drawn though an air filter 202, pass a turbo 204 and into an upper part of a cylinder 206, above a piston 208, where it will be mixed with a fuel, such as for example diesel or petrol. As the air/fuel mixture in the cylinder 206 is ignited, portions of the combustion gases will leak past the sides of the piston 208 (past piston ring(s) of the piston) and into a crankcase 210 comprised with the ICE 102.

The combustion gases entering the crankcase 210 comprise contaminants, such as for example soot particles. The combustion gases will further come in contact with and be partly mixed with further contaminants comprised in the crankcase 210, such as oil, forming a contaminated crankcase gas. A pressure formed by the combustion gases entering the crankcase 210 needs to be vented in a controlled manner, in accordance to the invention through the cleaning device 200. The crankcase gas is allowed to exit the crankcase 210 through an outlet 212, for example arranged at an upper portion of the ICE 102, other placements of such an outlet is of course possible and within the scope of the invention.

A first conduit 214 is provided for transporting the crankcase gas from the outlet 212 of the ICE 102 to an inlet 216 of the cleaning device 200. The crankcase gas is cleaned inside of the cleaning device 200, as will be further discussed below, and a cleaned crankcase gas will be released through a first outlet 218 of the cleaning device 200. A fan function may be provided inside of and/or outside of the cleaning device 200 for assisting the transportation of the crankcase gas through the cleaning device 200. The cleaned crankcase gas may for example, as illustrated in FIG. 2, be mixed with ambient air before entering the turbo 204. A second conduit 220 may be provided for connecting the first outlet 218 of the cleaning device 200 to the turbo 204. Alternatively, the cleaned crankcase gas may be allowed to enter the atmosphere, possibly passing through further filters members before doing so.

The contaminants/particles having been removed from the contaminated crankcase gas are preferably passed back to the crankcase 210 through a second outlet 222 of the cleaning device 200 and by a third conduit 224. The cleaning device 200 is preferably arranged such that the contaminants passed back to the crankcase 210 from the cleaning device 200 is allowed to do so by means of gravitation acting on the contaminants, i.e. by arranging the cleaning device 200 in a slightly elevated position as compared to the crankcase 210. Furthermore, it should be noted that it is desirable to arrange some form of check valve (one-way valve) functionality between the second outlet 222 of the cleaning device 200 and the crankcase 210, thereby only allowing contaminants to be passed back to the crankcase 210 and not allowing contaminated crankcase gases to be sucked "backwards" into the cleaning device 200.

Figure 3A:
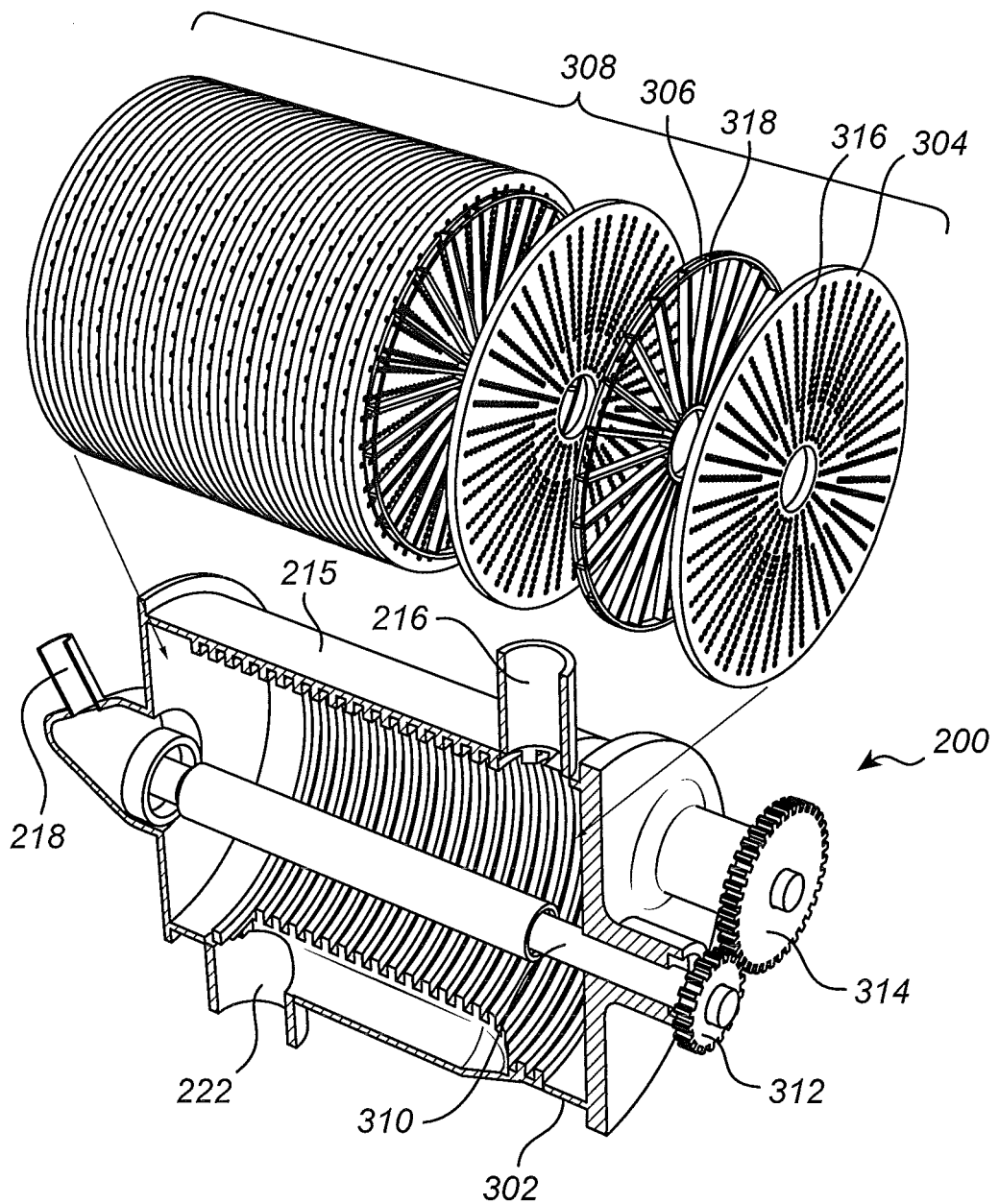
FIGS. 3a-3d conceptually illustrates preferred embodiments of the inventive cleaning device.

Turning now to FIG. 3a, which illustrates an example of a currently preferred embodiment of a cleaning device 200 that may be used together with the internal combustion engine 102. In the illustrated embodiment, the cleaning device 200 is comprised of a housing 302 having a longitudinally extending side wall portion 215 and arranged to have an essentially circular cross section. The housing 302 further comprises the inlet 216, the first outlet 218 and the second outlet 222 as discussed in relation to FIG. 2. In addition, the cleaning device 200 comprises a plurality of traverse wall members 304 and rotatably arranged members 306 arranged in a parallel and in close vicinity to each other in a stack 308. In a preferred embodiment and as is illustrated in FIG. 3*a*, the stack 308 is organized in such a manner that the traverse wall members 304 and the rotatably arranged members 306 are alternatingly arranged in the stack 308. In any case, it is desirable to position a rotatably arranged member 306 downstream of a traverse wall member 304. The stack 308 is arranged inside of the housing 302 of the cleaning device 200. The number of elements of the stack 308 may depend on the implementation in mind.

The rotatably arranged members 306 of the stack 308 are connected to an axis 310, at least partly extending to an outside of the housing 302. The part of the axis 310 extending outside of the housing 302 is provided with means for allowing rotation of the axis 310, and thus rotation of the rotatably arranged members 306. It may for example be possible, and as indicated in FIG. 3*a*, to provide one or a set of cog wheels, 312, 314, to be further connected to a rotating member of the ICE 102 for rotating the axis 310. It may alternatively be possible to rotate the axis 310 using either of an electrical motor, a hydraulic motor or a turbine. The set of cog wheels, 312, 314 may be used for adjusting a rotational speed of the axis 310 (e.g. forming a gear functionality).

The traverse wall members 304 of the stack 308 are preferably fixed to the inside of the housing 302. The traverse wall members 304 may for example be press fitted to the inside of the housing 302, or otherwise affixed to the inside of the housing (e.g. by welding). In a possible embodiment it may however be possible to allow for a slight rotation also of the traverse wall member 304, typically being a slow rotation in comparison to the rotational speed of the rotatably arranged member 306 during operation, possibly having a low friction based connection to the inside of the housing 302.

In the illustrated embodiment, the traverse wall member 304 is constituted by a flat disc comprises a plurality of through holes 316 for restricting a cross sectional area of a flow of the contaminated crankcase gas from the inlet 216 to the first outlet 218 of the cleaning device 200. The restriction provided by means of the plurality of through holes 316 will result in a change in the main direction of the gas flow. That is, the direction of the gas flow will be affected upstream of and in close vicinity of the traverse wall member 304 before passing the plurality of through holes 316 to the downstream side of the traverse wall member 304. Other possibilities exist for restricting and/or affect a direction of the gas flow, as for example will be further discussed in relation to FIG. 4.

As mentioned, downstream of the traverse wall member 304 there is provided a rotatably arranged member 306. The rotatably arranged member 306 comprises a plurality of wings 318 extending from a center of the rotatably arranged member 306 towards its periphery, where the periphery of the rotatably arranged member 306 preferably is provided with open portions. In a preferred embodiment and as is illustrated in FIG. 3*a*, the wings 318 are slightly angled, thereby efficiently acting as a fan for transporting the crankcase gas from the inlet 216 to the first outlet 218 of the cleaning device 200. The rotatably arranged member 306 may in such a case be defined as a wing wheel. It may however be possible, as indicated above, to provide the fan and the rotatably arranged member 306 as separate elements. In such a case the wings of the rotatably arranged member 306 may be angled essentially perpendicular to the traverse wall member 304. The fan may be provided inside of the housing or as a separate element outside of the housing. As understood, the angle of the wings will control the suction force provided by the wing wheels.

During operation of the cleaning device 200, the contaminated crankcase gas will be sucked from the crankcase, by the outlet 212, through the first conduit 214, by the inlet 216 and into the housing 302 by the rotation of the rotatably arranged members 306. The contaminated crankcase gas will then be forced to pass the plurality of through holes of the traverse wall member 304. Once having passed the traverse wall member 304, contaminants in the crankcase gas will come in contact with the wings 318 of the rotatably arranged member 306. Contaminants will cluster at the wings 318 and once the cluster of contaminants is "large enough" it will, by the rotation of the rotatably arranged member 306, be released from the wings 318, at least partly through the open portions of the periphery of the rotatably arranged member 306, and be forced towards an inside surface of the housing 302. Gravitation will then force the clustered contaminants towards a bottom of the inside of the housing 302 where the second outlet 222 is arranged. The third conduit 224 will release the contaminants back into the crankcase 210.

Figure 3B:
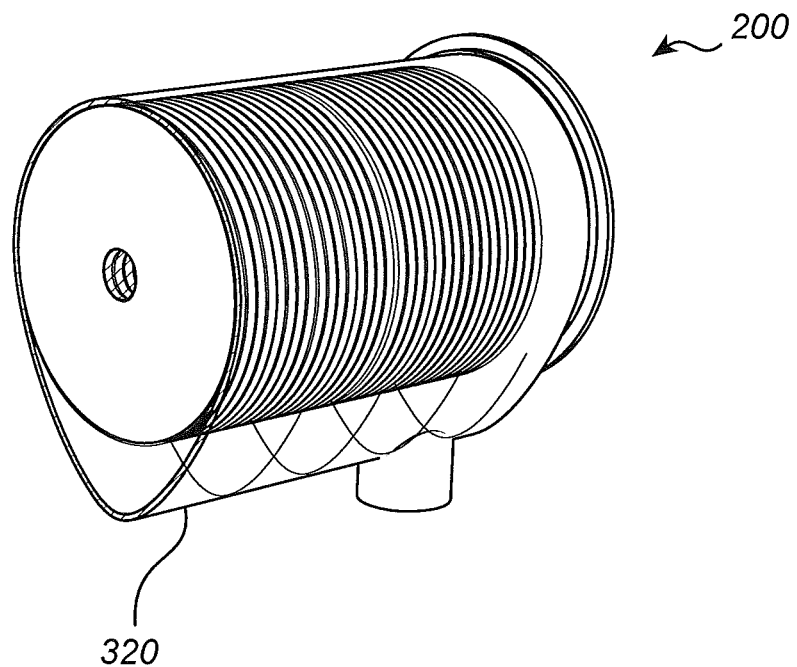

In some implementations it may be desirable to provide a housing of the cleaning device 200 to have an alternative cross section. For example, as is illustrated in FIG. 3*b*, the cleaning device 200 may be provided with a tapered lower end 320 for aggregating the contaminants before being passed back to the crankcase 210. As compared to an essentially circular cross section housing, the slight angled tapered lower end 320 will further improve runoff of contaminants from the inside of the housing towards its bottom end.

Figure 3C:
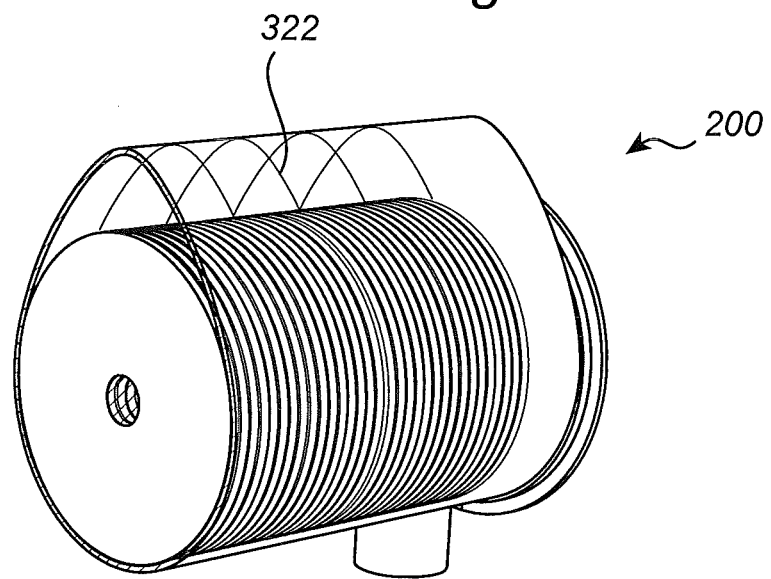

Alternatively, or also, the housing of the cleaning device 200 may be provided with a tapered upper end 322, as is shown in FIG. 3*c*. In a similar manner, such a tapered upper end 322 may provide improvements as to the runoff of contaminants from the inside of the housing such that contaminants does not fall directly back onto the rotatably arranged members 306, but rather runs along the inside surface of the housing towards the bottom of the housing. As understood from the above, it may of course be possible to provide the housing with a tapered lower end 320 and an upper tapered end 322, essentially forming an elliptic cross section of the housing. Similar functionality may be provided with similarly angular forms of the circular cross section of the housing. The shape of the traverse wall members 304 may, as an alternative to the illustrations provided in FIGS. 3*b* and 3*c*, be arranged to essentially correspond to the (inside) circular cross section of the housing.

Figure 3D:
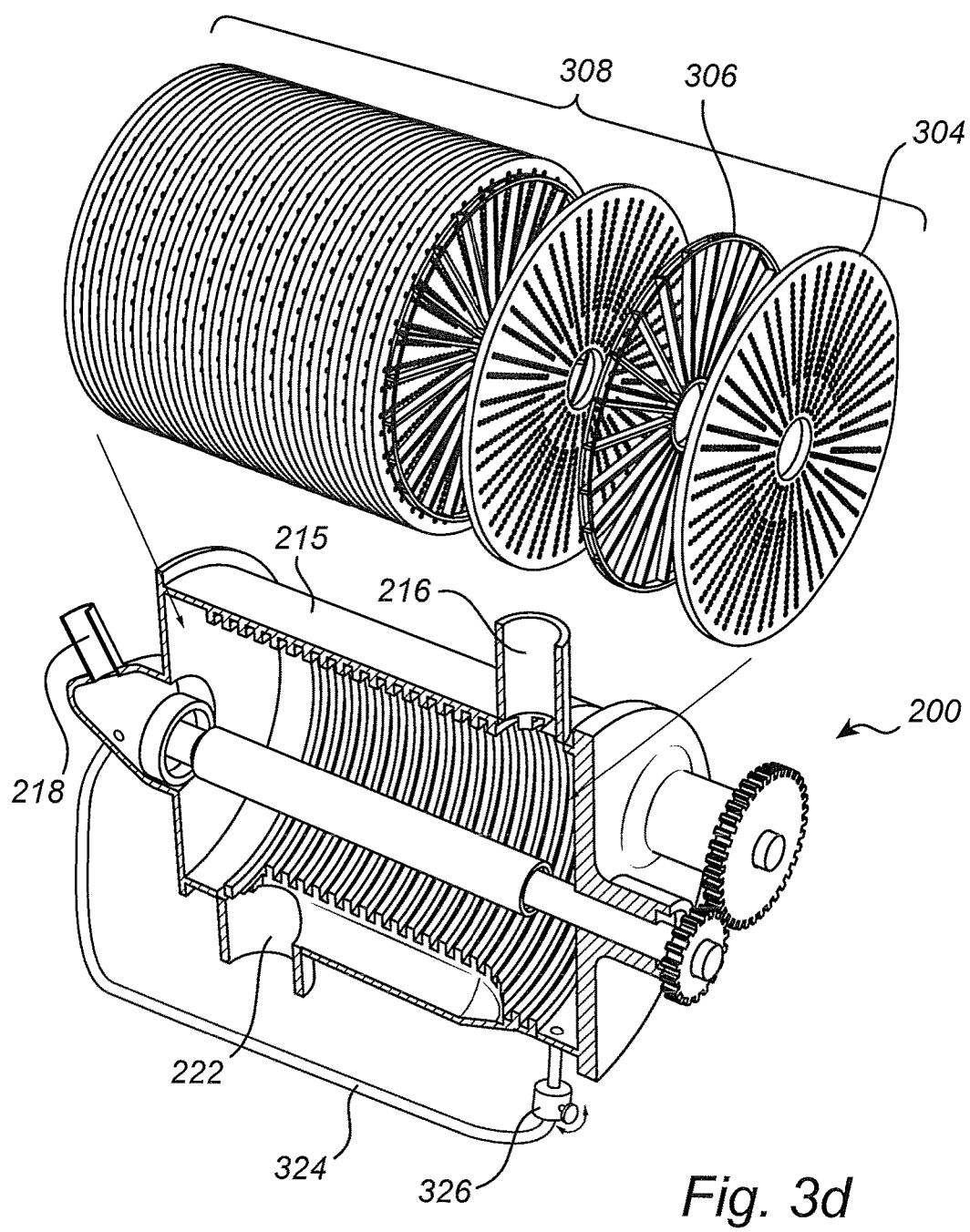

In a possible embodiment of the invention, it may be possible to equip the cleaning device 200 with means for recirculation the crankcase gas from a region downstream of the rotatably arranged member 306 to a region upstream of the traverse wall member 304. FIG. 3*d* provides an example of such an implementation, where a conduit 324 provides a path for a cleaned crankcase gas to again be forced through the stack 308. The flow through the conduit may in one embodiment be controlled using a valve 326. The valve may in turn be, e.g. automatically, operated based on an amount of contaminants being present in the crankcase gas being passed back to the crankcase (though further combustion as is illustrated in relation to FIG. 2). It may for example be possible to use a sensor to measure the amount of contaminants at the first outlet 218 and electrically control the valve 326 based on sensor data, for example using a control unit (not shown) provided with the ICE 102.

Alternatively, or also, it may be possible to control the recirculation based on a pressure level within the crankcase. That is, in case of for example the fan functionality of the rotatably arranged members 306 provides a larger suction force that what is desirable, it may be possible to allow a portion to the crankcase gas to be recirculated for lowering the suction force. In such an implementation the valve 326 may be mechanically operated based on a gas pressure inside of the crankcase 210. The recirculation means may not necessarily be implemented as external of the housing. Rather, it may be possible to provide a similar functionality integrated inside of the housing, for example by forming a recess on the inside of the housing.

Turning finally to FIG. 4 which illustrates a cleaning device 200 according to the invention provided with slightly alternative traverse wall members 402. In the alternative embodiment, rather than providing traverse wall members comprising a plurality of through holes 316, it may be possible to provide the traverse wall members 402 where a segment of the traverse wall member has been "removed". The gas flow will in such an implementation be forced to pass through the cross sectional opening provided by the "removed" segment. The traverse wall members 402 may be slightly rotated in relation to each other such that the gas flow is forced to change direction for each traverse wall member 402 of the stack 308'. In a possible embodiment of the invention the traverse wall members 402 of the stack 308 are rotated between 10-45 degrees for each traverse wall member 402. As understood from the above, different types of implementations of the traverse wall members may be provided for at least partly restrict the gas flow and/or affect a direction of the gas flow.

In summary, the present invention relates to a device for cleaning a contaminated crankcase gas generated during operation of an internal combustion engine comprising a crankcase, the device comprising a housing having a longitudinally extending side wall portion, the housing comprising, an inlet configured to receive the contaminated crankcase gas from the crankcase, and an outlet configured to release a cleaned crankcase gas out from the housing, a fan configured to establishing a gas flow through the housing between the inlet and the outlet, and a cleaning arrangement for cleaning the contaminated crankcase gas, the cleaning arrangement being arranged inside of the housing, wherein the cleaning arrangement comprises a traverse wall member configured to cover a portion of a cross section of the housing, wherein the traverse wall is configured to at least partly restrict the gas flow and/or affect a direction of the gas flow, and a rotatably arranged member arranged downstream of the traverse wall in the direction of the gas flow, wherein the rotatably arranged member comprises a plurality of wings and by its rotation is configured to redirect contaminants comprised in the crankcase gas towards an inside surface of the longitudinally extending side wall portion of the housing.

By means of the invention, the use of the traverse wall member combined with the rotatably arranged member will advantageously allow for an increased flexibility as to constructing the cleaning device while maintaining or possibly improving cleaning of the contaminated crankcase gas.

Even though the invention has been described with reference to specific exemplifying embodiments thereof, many different alterations, modifications and the like will become apparent for those skilled in the art in practicing the claimed invention, from a study of the drawings, the disclosure, and the appended claims. For example, the above described cleaning devices have been illustrated to comprise a plurality of traverse wall members and rotatably arranged members arranged in a stack. It may be possible and within the scope of the invention, to limit the number of elements of the stack, for example providing a plurality of traverse wall members but only a single rotatably arranged member. Further similar embodiments are possible and within the scope of the invention.

In the description above, all the rotatably arranged members in the stack have the same configuration (design and shape). It may however be feasible and within the scope of the invention that the rotatably arranged members are of different configurations. Further, in the description above, all the traverse wall members in the stack have the same configuration (design, shape, and through hole pattern). It may however be feasible and within the scope of the invention that the traverse wall members are of different configurations.

In addition, in the claims, the word "comprising" does not exclude other elements or steps, and the indefinite article "a" or "an" does not exclude a plurality.

The invention claimed is:

1. A device for cleaning a contaminated crankcase gas generated during operation of an internal combustion engine comprising a crankcase, the device comprising: a housing having a longitudinally extending side wall portion, the housing comprising: an inlet configured to receive the contaminated crankcase gas from the crankcase, and an outlet configured to release a cleaned crankcase gas out from the housing, a fan configured to establishing a gas flow through the housing between the inlet and the outlet, and a cleaning arrangement for cleaning the contaminated crankcase gas, the cleaning arrangement being arranged inside of the housing, the cleaning arrangement comprising a traverse wall member configured to cover a portion of a cross section of the housing, wherein the traverse wall is configured to at least partly restrict the gas flow and/or affect a direction of the gas flow, and a rotatably arranged member arranged downstream of the traverse wall member in the direction of the gas flow, wherein the rotatably arranged member comprises a plurality of wings and by its rotation is configured to redirect contaminants comprised in the crankcase gas towards an inside surface of the longitudinally extending side wall portion of the housing, wherein the cleaning arrangement further comprises a plurality of traverse wall members and rotatably arranged members alternatingly arranged in close vicinity to each other in a stack, wherein the traverse wall member is arranged to be stationary in the housing, and wherein the traverse wall member comprises a plurality of through holes for restricting a cross sectional area of the gas flow.

2. The device according to claim 1, wherein each of the plurality of rotatably arranged members is provided with open portions at a periphery thereof, whereby the wings of the rotatably arranged members are configured to redirect contaminants through the open portions and to the inside surface of the longitudinally extending side wall portion of the housing.

3. The device according to claim 1, wherein the rotatably arranged member is arranged in parallel with the traverse wall member in the direction of the gas flow.

4. The device according to claim 1, wherein the rotatably arranged member is arranged in close vicinity of the traverse wall member.

5. The device according to claim 1, wherein the fan and the rotatably arranged member are jointly constituted, forming a wing wheel.

6. The device according to claim 1, wherein the traverse wall member is constituted by a flat disc.

7. The device according to claim 1, wherein the housing presents a circular cross section.

8. The device according to claim 1, wherein the housing presents a cross section having at least one of a tapered lower end and a tapered upper end.

9. The device according to claim 1, wherein the housing is elongated.

10. The device according to claim 1, wherein the device is configured to recirculate the crankcase gas from a region downstream of the rotatably arranged member to a region upstream of the traverse wall member.

11. The device according to claim 10, further comprising a controllable valve mechanism configured to adjust a level of crankcase gas recirculation based on a crankcase gas pressure.

12. The device according to claim 11, wherein the valve mechanism is configured to be controlled based on a crankcase gas pressure in the crankcase.

13. The device according to claim 1, wherein the rotatably arranged member is configured to be connected to a transmission of and mechanically driven by the internal combustion engine.

14. The device according to claim 1, wherein the rotatably arranged member is configured to be driven by an electric motor.

15. The device according to claim 1, wherein the rotatably arranged member is configured to be driven by at least one of a hydraulic motor or turbine.

16. A powertrain comprising the internal combustion engine according to claim 1 and a transmission driven by the internal combustion engine, wherein the rotatably arranged member is operatively connected to the transmission for being driven by the transmission.

17. A vehicle comprising the powertrain according to claim 16.

18. A device for cleaning a contaminated crankcase gas generated during operation of an internal combustion engine comprising a crankcase, the device comprising: a housing having a longitudinally extending side wall portion, the housing comprising: an inlet configured to receive the contaminated crankcase gas from the crankcase, and an outlet configured to release a cleaned crankcase gas out from the housing, a fan configured to establishing a gas flow through the housing between the inlet and the outlet, and a cleaning arrangement for cleaning the contaminated crankcase gas, the cleaning arrangement being arranged inside of the housing, the cleaning arrangement comprising a traverse wall member configured to cover a portion of a cross section of the housing, wherein the traverse wall is configured to at least partly restrict the gas flow and/or affect a direction of the gas flow, and a rotatably arranged member arranged downstream of the traverse wall member in the direction of the gas flow, wherein the rotatably arranged member comprises a plurality of wings and by its rotation is configured to redirect contaminants comprised in the crankcase gas towards an inside surface of the longitudinally extending side wall portion of the housing, wherein the cleaning arrangement further comprises a plurality of traverse wall members and rotatably arranged members alternatingly arranged in close vicinity to each other in a stack, there being a stacked array of multiple traverse members and rotatable members.

19. A device for cleaning a contaminated crankcase gas generated during operation of an internal combustion engine comprising a crankcase, the device comprising: a housing having a longitudinally extending side wall portion, the housing comprising: an inlet configured to receive the contaminated crankcase gas from the crankcase, and an outlet configured to release a cleaned crankcase gas out from the housing, a fan configured to establishing a gas flow through the housing between the inlet and the outlet, and a cleaning arrangement for cleaning the contaminated crankcase gas, the cleaning arrangement being arranged inside of the housing, the cleaning arrangement comprising a traverse wall member configured to cover a portion of a cross section of the housing, wherein the traverse wall is configured to at least partly restrict the gas flow and/or affect a direction of the gas flow, and a rotatably arranged member arranged downstream of the traverse wall member in the direction of the gas flow, wherein the rotatably arranged member comprises a plurality of wings and by its rotation is configured to redirect contaminants comprised in the crankcase gas towards an inside surface of the longitudinally extending side wall portion of the housing, wherein the cleaning arrangement further comprises a plurality of traverse wall members and rotatably arranged members alternatingly arranged in close vicinity to each other in a stack, there being multiple stacks of traverse members and rotatable members and a plurality of angled wings on the rotatable members.

* * * * *